(12) United States Patent
Itagaki et al.

(10) Patent No.: US 10,142,966 B2
(45) Date of Patent: Nov. 27, 2018

(54) WIRELESS COMMUNICATION DEVICE AND METHOD FOR COMMUNICATION BETWEEN A BASE STATION AND A WIRELESS NODE

(71) Applicant: SONY CORPORATION, Tokyo (JP)

(72) Inventors: Takeshi Itagaki, Saitama (JP); Masanori Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 75 days.

(21) Appl. No.: 15/304,555

(22) PCT Filed: Mar. 4, 2015

(86) PCT No.: PCT/JP2015/056406
§ 371 (c)(1),
(2) Date: Oct. 17, 2016

(87) PCT Pub. No.: WO2015/163014
PCT Pub. Date: Oct. 29, 2015

(65) Prior Publication Data
US 2017/0048825 A1 Feb. 16, 2017

(30) Foreign Application Priority Data

Apr. 24, 2014 (JP) .................................. 2014-090258

(51) Int. Cl.
*H04W 72/04* (2009.01)
*H04W 64/00* (2009.01)
(Continued)

(52) U.S. Cl.
CPC ........... *H04W 72/04* (2013.01); *H04W 64/00* (2013.01); *H04W 72/02* (2013.01);
(Continued)

(58) Field of Classification Search
None
See application file for complete search history.

(56) References Cited

U.S. PATENT DOCUMENTS 6,768,730 B1 * 7/2004 Whitehill .............. G01S 5/0284
370/348
8,818,403 B1 * 8/2014 Gauba ................... H04W 24/00
455/11.1
(Continued)

FOREIGN PATENT DOCUMENTS

JP 2008-131520 A 6/2008
JP 2010-011414 A 1/2010
JP 2012-119768 A 6/2012

OTHER PUBLICATIONS

"Part 11: Wireless LAN Medium Access Control (MAC) and Physical Layer (PHY) Specifications", IEEE Std 802.11™-2012, Mar. 29, 2012, pp. 01-2793.
(Continued)

*Primary Examiner* — George C Atkins
(74) *Attorney, Agent, or Firm* — Xsensus, LLP

(57) ABSTRACT

[Object] To provide a wireless communication device and a wireless communication method capable of further reducing power consumption in a wireless node. [Solution] Provided is a wireless communication device including a wireless communication unit configured to transmit a signal to a base station through wireless communication, a positional information acquisition unit configured to acquire positional information indicating a position of the wireless communication device, and a control unit configured to determine an area to which the wireless communication device belongs based on the positional information acquired by the positional information acquisition unit and control the wireless communication unit to perform the transmission according
(Continued)

to radio resources allocated to the area to which the wireless communication device belongs.

14 Claims, 14 Drawing Sheets

(51) Int. Cl.
*H04W 72/02* (2009.01)
*H04W 88/02* (2009.01)

(52) U.S. Cl.
CPC .......... *H04W 72/048* (2013.01); *H04W 88/02* (2013.01); *Y02D 70/00* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/168* (2018.01); *Y02D 70/21* (2018.01)

(56) References Cited

U.S. PATENT DOCUMENTS

| | | | | |
|---|---|---|---|---|
| 2005/0037764 | A1* | 2/2005 | Trachtman | H04W 16/00 455/450 |
| 2008/0248803 | A1* | 10/2008 | Lee | H04W 52/346 455/450 |
| 2009/0135791 | A1* | 5/2009 | Kawamura | H04J 13/00 370/337 |
| 2010/0118827 | A1* | 5/2010 | Sundaresan | H04W 72/04 370/330 |
| 2011/0292919 | A1* | 12/2011 | Trainin | H04L 5/0048 370/338 |

OTHER PUBLICATIONS

"Wireless LAN Medium Access Control (MAC) and Physical Layer (PHY) Specifications", LAN/MAN Standards Committee of the IEEE Computer Society, Feb. 6, 2012, 2792 pages.

* cited by examiner

WIRELESS COMMUNICATION DEVICE AND METHOD FOR COMMUNICATION BETWEEN A BASE STATION AND A WIRELESS NODE

CROSS REFERENCE TO RELATED APPLICATIONS

This application is a U.S. National Phase of International Patent Application No. PCT/JP2015/056406 filed on Mar. 4, 2015, which claims priority benefit of Japanese Patent Application No. JP 2014-090258 filed in the Japan Patent Office on Apr. 24, 2014. Each of the above-referenced applications is hereby incorporated herein by reference in its entirety.

TECHNICAL FIELD

The present disclosure relates to a wireless communication device and a wireless communication method.

BACKGROUND ART

In recent years, technologies for wireless sensor networks have actively been developed. Wireless sensor networks are technologies for collecting people's behavior information or surrounding environment information, for example, by connecting wireless nodes in which wireless devices and sensor devices such as position sensors or temperature sensors are combined, to wireless networks. Wireless sensor networks are expected to be utilized in various fields such as monitoring systems and home automation. This is because advantages such as flexibility of reduction in cost, expansion of sensing ranges, and changes in networks can be expected when sensor networks are constructed with wireless communication.

Wireless sensor network systems can be considered to be designed variously depending on which is preferred among requests of applications to be applied. Examples of the requests include the amount of information of data and a direction of the data to be exchanged, a scale of the capacity of wireless nodes per base station, an extent of a communicable area, complexity of signal processing on a wireless node side, a transmission delay time, tolerance for mobility of a wireless node, reliability of data transmission, and addition of a base station or a wireless node.

The following Non-Patent Literature 1 is a technical specification regarding a wireless local area network (LAN) drawn up by the IEEE. The following Non-Patent Literature 1 discloses a technology for resolving a so-called hidden terminal problem in which waves transmitted from wireless nodes having a positional relation in which mutual transmitted radio waves may not be detected collide in order to improve reliability of data transmission. Examples of such a technology include a technology for providing a controlled access by which a base station schedules transmission and reception of subordinate wireless nodes and a technology for transmitting request to send/clear to send (RTS/CTS).

CITATION LIST

Non-Patent Literature

Non-Patent Literature 1: IEEE Standard 802.11-2012

SUMMARY OF INVENTION

Technical Problem

In the technology disclosed in the foregoing Non-Patent Literature 1, however, it is necessary to transmit and receive control messages for controlling data transmission timings between a base station and a wireless node in order to improve the reliability of the data transmission. Further, in the wireless node, it is necessary to perform a process of receiving the control message and interpreting content of the control message. Accordingly, power consumption necessary for such a process is important in the wireless node. Here, since wireless nodes are assumed to be installed in various locations for a long time, the wireless nodes can necessarily operate with batteries for a long time to achieve low power consumption.

Accordingly, it is desirable to provide a novel and improved wireless communication device and a novel and improved wireless communication method capable of further reducing power consumption in a wireless node.

Solution to Problem

According to the present disclosure, there is provided a wireless communication device including a wireless communication unit configured to transmit a signal to a base station through wireless communication, a positional information acquisition unit configured to acquire positional information indicating a position of the wireless communication device, and a control unit configured to determine an area to which the wireless communication device belongs based on the positional information acquired by the positional information acquisition unit and control the wireless communication unit to perform the transmission according to radio resources allocated to the area to which the wireless communication device belongs.

According to the present disclosure, there is provided a wireless communication method performed by a wireless communication device which transmits a signal to a base station through wireless communication, the method including acquiring positional information indicating a position of the wireless communication device, and determining an area to which the wireless communication device belongs based on the acquired positional information and controlling the wireless communication device to perform the transmission according to radio resources allocated to the area to which the wireless communication device belongs.

Advantageous Effects of Invention

According to the present disclosure described above, it is possible to further reduce power consumption in a wireless node.

Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Hereinafter, preferred embodiments of the present disclosure will be described in detail with reference to the appended drawings. In this specification and the drawings, elements that have substantially the same function and structure are denoted with the same reference signs, and repeated explanation is omitted.

The description will be made in the following order.
1. Overview
2. First Embodiment
2-1. Configuration example of base station
2-2. Configuration example of wireless node
2-3. Operation process
2-4. Advantageous effects
2-5. Modification examples
3. Second Embodiment
4. Third Embodiment
5. Application examples
6. Conclusion
<1. OVERVIEW>

First, an overview of a wireless communication system according to an embodiment of the present disclosure will be described with reference to FIGS. 1 and 2.

Figure 1:
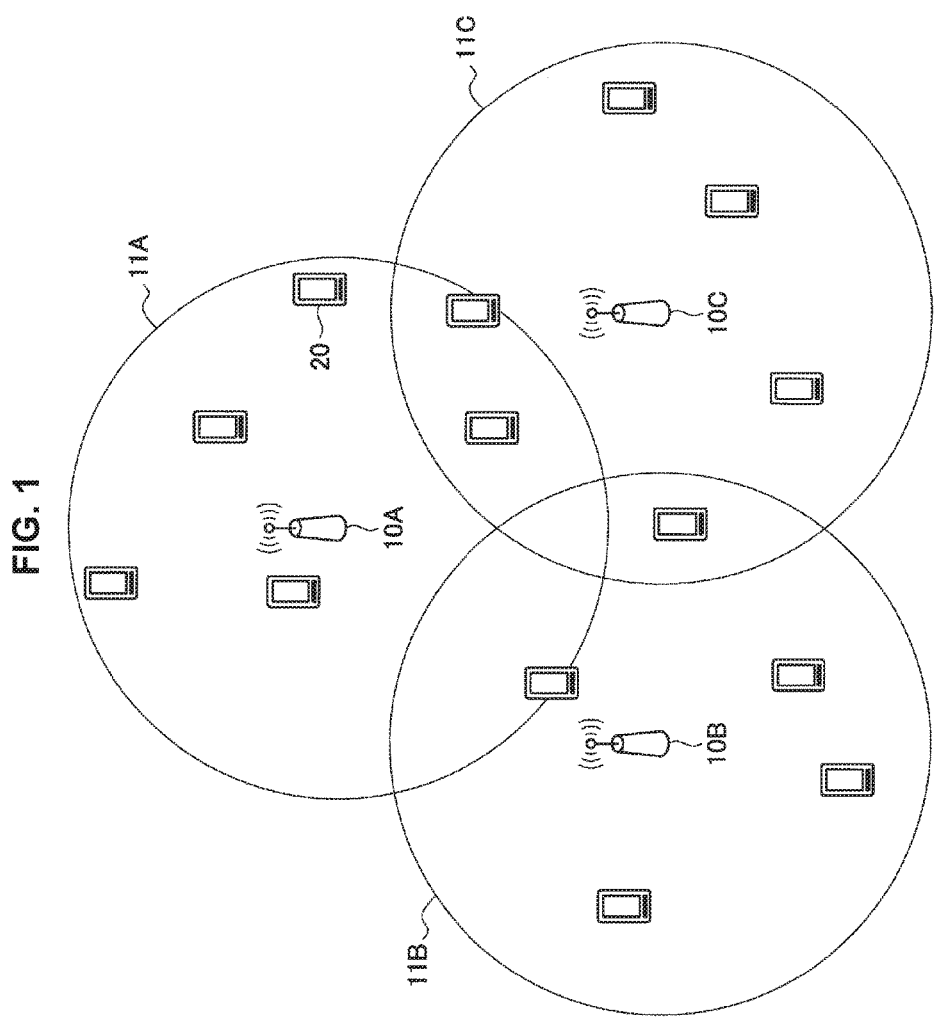
FIG. 1 is a diagram showing the entire configuration of a wireless communication system according to an embodiment.

FIG. 1 is a diagram showing the entire configuration of a wireless communication system according to an embodiment. As shown in FIG. 1, a wireless communication system 1 includes base stations 10A, 10B, and 10C and one or more wireless communication devices 20.

The base stations 10A, 20B, and 20C provide wireless communication services to one or more terminal devices located inside cells 11A, 11B, and 11C administrated by the base stations 10A, 10B, and 10C. For example, the base station 10A can communicate with the wireless communication device 20 located inside the cell 11A. The cells 11A, 11B, and 11C may be administrated in conformity with, for example, a wireless communication scheme such as any kind of wireless local area network (LAN) scheme such as Institute of Electrical and Electronics Engineers (IEEE) 802.11a, 11b, 11g, 11n, 11ac, or 11ad, a wireless personal area network (PAN) scheme such as ultra wideband (UWB) or Zigbee, or a wireless metropolitan area network (MAN) scheme such as IEEE 802.16. The base stations 10A, 10B, and 10C may be, for example, access points (APs) such as Wireless Fidelity (Wi-Fi) (registered trademark).

The wireless communication device 20 is a device capable of performing wireless communication with the base station. In the example of FIG. 1, the wireless communication device 20 is a wireless node that includes various sensors. The wireless node can receive a wireless signal transmitted from the base station within a range of the cell administrated by the wireless node. The wireless node can transmit measurement data acquired by each sensor to the base station via an uplink from the wireless node to the base station.

Figure 2:
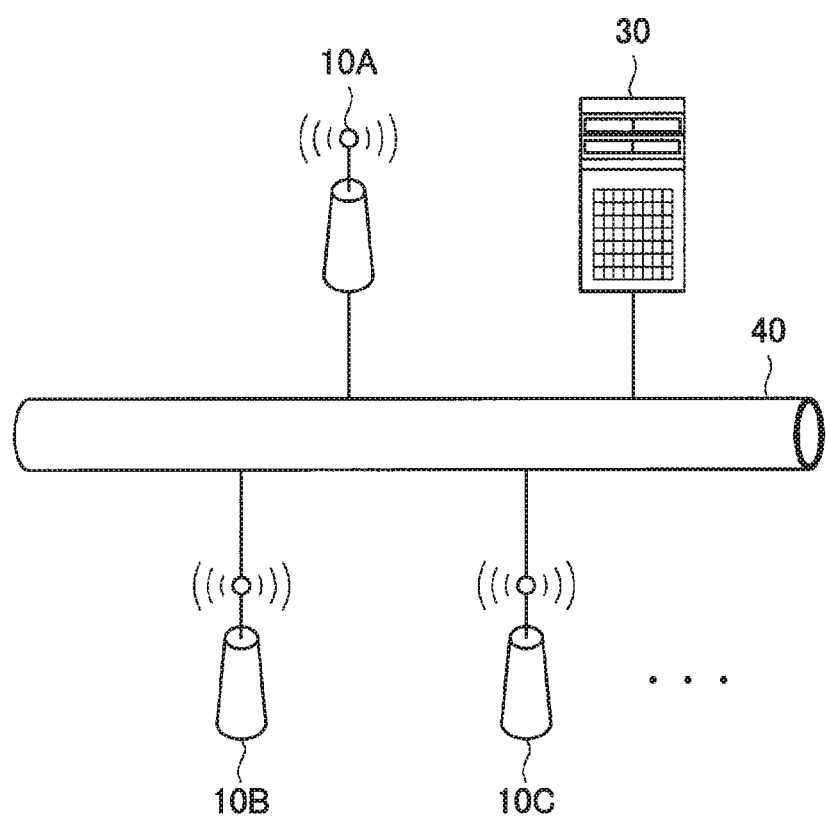
FIG. 2 is an explanatory diagram showing backbone communication in the wireless communication system according to the embodiment.

FIG. 2 is an explanatory diagram showing backbone communication in the wireless communication system 1 according to the embodiment. As shown in FIG. 2, the wireless communication system 1 further includes a management server 30 connected to the base stations 10A, 10B, and 10C via a backbone communication path 40. Each base station can communicate with the management server 30 and can also communicate with other base stations. The backbone communication path 40 may be realized through any kind of wired communication of, for example, a wired LAN, a telephone line, or the Internet network or may be realized through any kind of wireless communication described above. The management server 30 receives measurement data received from the wireless nodes 20 by the base stations 10A, 10B, and 10C via the backbone communication path 40. Then, the management server 30 aggregates the measurement data collected from the many wireless nodes 20 and performs various analysis processes.

In the present specification, when it is not necessary to distinguish the base stations 10A, 10B, and 10C from each other, the base stations 10A, 10B, and 10C are generally named the base stations 10 by omitting letters suffixed to the reference numerals. The same also applies to the other constituent elements (for example, the cells 11). The present disclosure is not limited to the example of FIG. 1. The wireless communication device 20 may be any kind of device such as a relay station that includes no sensor and relays wireless signals received from the wireless node 20 to the base station 10.

In the present disclosure, an example in which four requests in which the base station 10 can cover a large area (the cell 11), the base station 10 can accommodate many wireless nodes 20, data transmission is reliable, and power consumption of the wireless node 20 is small are preferred as application requests to the above-described wireless communication system 1 is assumed. In order for the base station to cover a large area and accommodate many wireless nodes while suppressing packet loss, a structure that performs multiplexing without collision of wireless transmission from many wireless nodes is necessary. In a general random access system, a collision probability can be reduced by suppressing transmission when a transmission source detects transmission of another wireless node or base station through carrier sensing. However, when an area is enlarged, a case in which the wireless nodes have a positional relation (referred to as a hidden terminal) in which mutual transmission radio waves may not be detected occurs often. In such a situation, carrier sensing does not work well and there is a high possibility of wireless signals on uplinks from the wireless nodes colliding.

As a technology for avoiding collision of mutual wireless signals from the wireless nodes, for example, there is a technology for providing a controlled access by which a base station schedules transmission and reception of subordinate wireless nodes and a technology for transmitting RTS/CTS. However, when such a technology is used, exchange of messages between the wireless node and the base station increases. Therefore, an increase in processes in the wireless nodes and an increase in power consumption may be caused. Accordingly, the present disclosure provides a structure in which the base station realizes accommodation of many wireless nodes while suppressing power consumption of the wireless nodes and suppressing packet loss and without performing messaging between the base station and the nodes. Such a structure will be described in detail according to each embodiment.

<2. First Embodiment>

[2-1. Configuration Example of Base Station]

Figure 3:
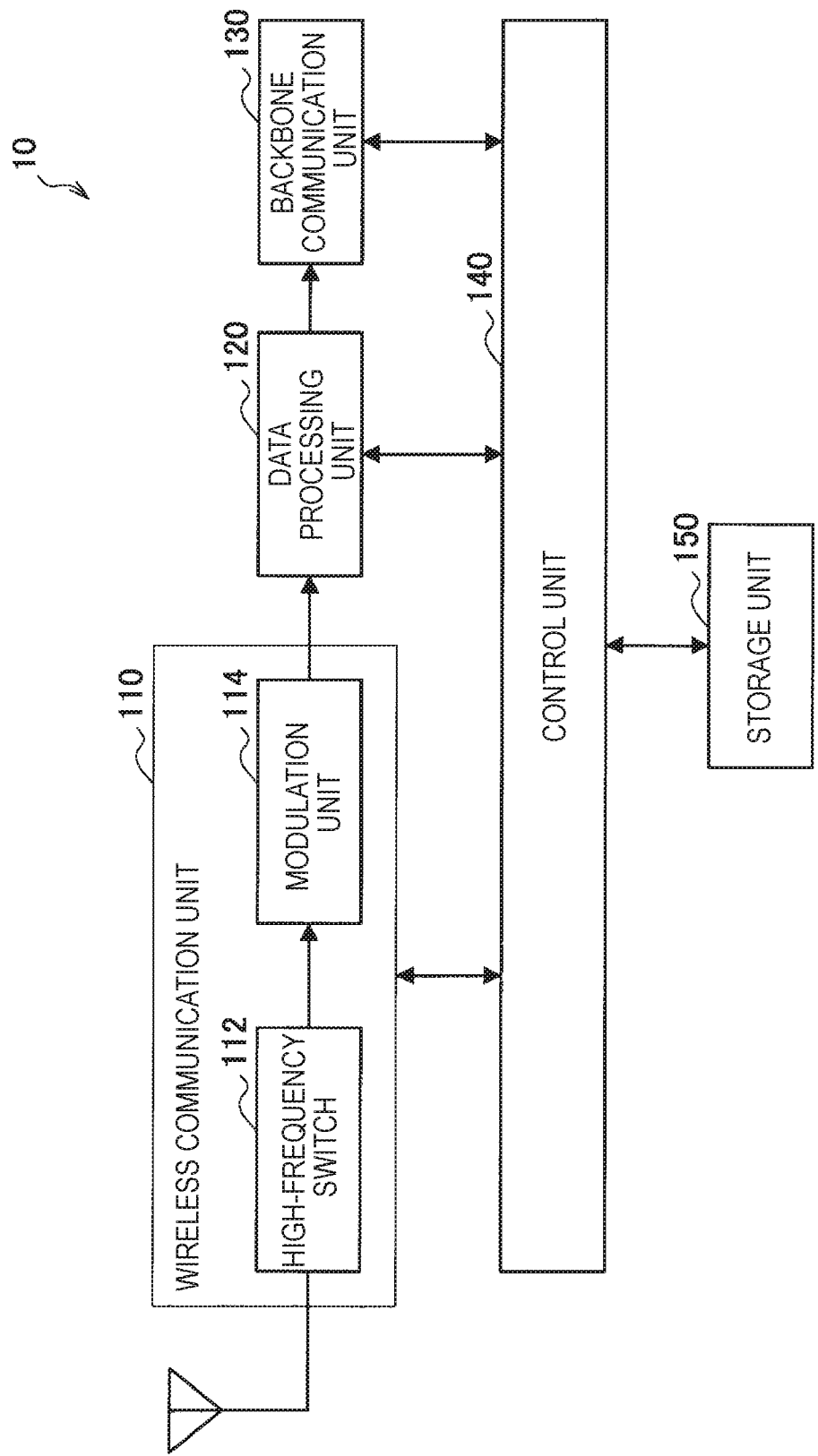
FIG. 3 is a block diagram showing an example of the internal configuration of a base station according to a first embodiment.

FIG. 3 is a block diagram showing an example of the internal configuration of the base station 10 according to a first embodiment. As shown in FIG. 3, the base station 10 includes a wireless communication unit 110, a data processing unit 120, a backbone communication unit 130, a control unit 140, and a storage unit 150.

The wireless communication unit 110 is a wireless communication interface which relays wireless communication with another device by the base station 10. In the embodiment, the wireless communication unit 110 performs wireless communication with the wireless node 20. The wireless communication unit 110 receives a wireless signal including measurement data transmitted from the wireless node 20 via an antenna and outputs the wireless signal to the data processing unit 120. In the example shown in FIG. 3, one antenna is shared for transmission and reception, but respective separate antennas may be used. As shown in FIG. 3, the wireless communication unit 110 functions as a high-frequency switch 112 and a demodulation unit 114. The wireless signal transmitted from the base station 10 and including the measurement data is also referred to as a sensor signal below.

(1-1) High-Frequency Switch 112

The high-frequency switch 112 connects the antenna to a reception system circuit and a transmission system circuit. For example, the high-frequency switch 112 performs switching of a received signal and a transmitted signal or switching of connection with a plurality of circuits corresponding to different communication standards. In the example shown in FIG. 3, the high-frequency switch 112 connects the antenna to the demodulation unit 114. The high-frequency switch 112 outputs the wireless signal received by the antenna to the demodulation unit 114.

(1-2) Demodulation Unit 114

The demodulation unit 114 is a reception system circuit of the wireless communication unit 110. For example, the demodulation unit 114 demodulates the wireless signal received from the wireless node 20 and outputs a demodulated signal to the data processing unit 120. When the wireless signal is directly spread by a spread code, the demodulation unit 114 may separate the sensor signal received from each wireless node 20 by performing despreading on the received wireless signal. The demodulation unit 114 is assumed to simultaneously perform despreading of a plurality of kinds of spread codes in parallel. When the base station 10 performs carrier sensing, the demodulation unit 114 measures a reception level at a frequency at which radio waves are scheduled to be emitted by the antenna and outputs a measurement result to the control unit 140.

(2) Data Processing Unit 120

The data processing unit 120 performs various processes on a signal output from the demodulation unit 114. For example, the data processing unit 120 extracts the measurement data measured in the wireless node 20 from the signal output from the demodulation unit 114. The data processing unit 120 outputs the extracted measurement data to the backbone communication unit 130.

(3) Backbone Communication Unit 130

The backbone communication unit 130 is a communication interface with which the base station 10 relays communication between the management server 30 and another base station 10. For example, the backbone communication unit 130 transmits the measurement data output from the data processing unit 120 to the management server 30 via the backbone communication path 40 described with reference to FIG. 2. The backbone communication unit 130 may transmit or receive a control message for adjusting radio resources or the like used by the base station 10 to and from another base station 10.

(4) Control Unit 140

The control unit 140 functions as an arithmetic processing device and a control device and has a function of controlling all of the operations in the base station 10 according to various programs. For example, the control unit 140 may exchange a message with another base station 10 via the backbone communication unit 130 and adjust radio resources used to transmit the wireless signal from the base station 10 to the wireless node 20. The control unit 140 may adjust transmission power when the wireless communication unit 110 transmits the wireless signal. The control unit 140 may perform carrier sensing. Specifically, the control unit 140 may suppress transmission of the wireless signal based on the measurement result of a reception level of the wireless signal output from the demodulation unit 114.

(5) Storage Unit 150

The storage unit 150 stores various kinds of information to be used in the base station 10. For example, the storage unit 150 may store candidates of available radio resources and transmission power to be used. The control unit 140 may perform transmission setting of the wireless signal using various kinds of information stored in the storage unit 150. Additionally, the storage unit 150 may store candidates of the despread codes which are used in the demodulation unit 114. The storage unit 150 may store candidates of the radio resources which can be used to transmit the sensor signal by the wireless node 20.

The example of the internal configuration of the base station 10 according to the embodiment has been described. Next, an example of the internal configuration of the wireless node 20 according to the embodiment will be described with reference to FIG. 4.

[2-2. Configuration Example of Wireless Node]

Figure 4:
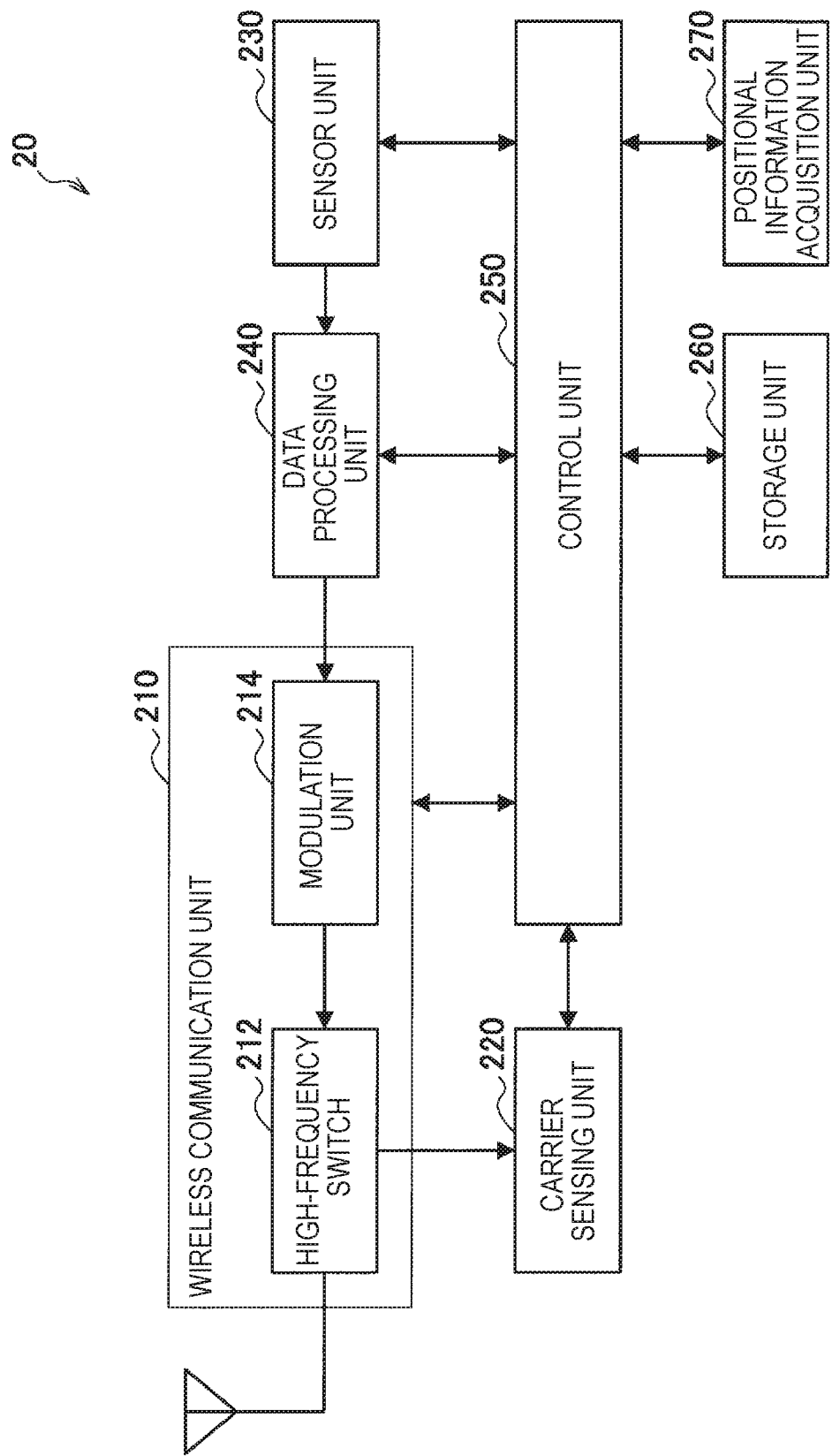
FIG. 4 is a block diagram showing an example of the internal configuration of a wireless node according to the first embodiment.

FIG. 4 is a block diagram showing an example of the internal configuration of the wireless node 20 according to the embodiment. As shown in FIG. 4, the wireless node 20 includes a wireless communication unit 210, a carrier sensing unit 220, a sensor unit 230, a data processing unit 240, a control unit 250, a storage unit 260, and a positional information acquisition unit 270.

(1) Wireless Communication Unit 210

The wireless communication unit 210 is a wireless communication interface which relays wireless communication with another device by the wireless node 20. In the embodiment, the wireless communication unit 210 performs wireless communication with the base station 10. For example, the wireless communication unit 210 transmits a sensor signal including measurement data acquired by the sensor unit 230 to be described below to the base station 10 via an antenna. In the example shown in FIG. 4, one antenna is shared for transmission and reception, but respective separate antennas may be used. As shown in FIG. 4, the wireless communication unit 210 functions as a high-frequency switch 212 and a modulation unit 214.

(1-1) High-Frequency Switch 212

The high-frequency switch 212 connects the antenna to a reception system circuit and a transmission system circuit. For example, the high-frequency switch 212 performs switching of a received signal and a transmitted signal or switching of connection with a plurality of circuits corresponding to different communication standards. In the example shown in FIG. 4, the high-frequency switch 212 connects the antenna to the carrier sensing unit 220 and the modulation unit 214. The high-frequency switch 212 outputs the wireless signal received by the antenna to the carrier sensing unit 220. The high-frequency switch 212 outputs a wireless signal output from the modulation unit 214 to the antenna to transmit the wireless signal to the base station 10.

(1-2) Modulation Unit 214

The modulation unit 214 is a transmission system circuit of the wireless communication unit 210. For example, the modulation unit 214 modulates data output from the data processing unit 240 to generate a sensor signal and transmits the sensor signal (transmission signal) to the base station 10 via the antenna. Here, the modulation unit 214 transmits the sensor signal based on transmission setting designated by the control unit 250 to be described below. For example, the modulation unit 214 transmits the sensor signal using radio resources designated by the control unit 250. As will be described below, the sensor signal transmitted using the same radio resources is received at the same reception level (reception power level) in the base station 10, and thus a so-called perspective problem is resolved. The wireless communication system 1 can adopt code division multiple access (CDMA). Specifically, the modulation unit 214 may directly spread the sensor signal using a spread code allocated to each wireless node 20. The spread code may be unique to the wireless node 20 or may be different for each wireless node 20. Since the perspective problem is resolved in the base station 10, the sensor signal transmitted from each wireless node 20 can be separated and acquired through despreading. The modulation unit 214 can perform modulation using any modulation scheme such as frequency shift keying (FSK), phase shift keying (PSK), or amplitude shift keying (ASK).

(2) Carrier Sensing Unit 220

The carrier sensing unit 220 has a function of detecting empty radio resources. For example, the carrier sensing unit 220 measures a reception level at a time zone and a frequency band used for the wireless communication unit 210 to transmit the sensor signal under the control of the control unit 250. Then, the carrier sensing unit 220 outputs the measurement result to the control unit 250.

(3) Sensor Unit 230

The sensor unit 230 has a function of measuring a measurement target of the wireless node 20 and acquiring various kinds of measurement data. For example, the sensor unit 230 may be realized by a camera or a stereo camera, a microphone, a pressure sensor measuring a pressure, a speed sensor measuring a speed and acceleration, a temperature sensor measuring temperature (ambient temperature), or a clock measuring time. The sensor unit 230 may be realized by a biological sensor measuring biological information such as myoelectricity, a nerve, a pulse, or body temperature. The sensor unit 230 may measure at least one of the listed measurement targets or may measure any other measurement target. The sensor unit 230 outputs measurement data indicating the measurement result to the data processing unit 240.

(4) Data Processing Unit 240

The data processing unit 240 performs various kinds of processes on the measurement data output from the sensor unit 230. For example, the data processing unit 240 packets the measurement data and outputs the packeted measurement data to the modulation unit 214. The data processing unit 240 may include positional information acquired by the positional information acquisition unit 270 to be described below in the measurement data and may packet the measurement data.

(5) Control Unit 250

The control unit 250 functions as an arithmetic processing device and a control device and has a function of controlling all of the operations in the wireless node 20 according to various programs. For example, the control unit 250 determines an area to which the wireless node 20 belongs based on the positional information acquired by the positional information acquisition unit 270 to be described below and controls the wireless communication unit 210 to perform transmission according to the radio resources allocated to the area to which the wireless node 20 belongs. The wireless communication system 1 according to the embodiment divides a geographical space into a plurality of areas and allocates the radio resources to the areas. The radio resources are allocated by allocating at least one of a transmission time zone (transmission time slot) or a transmission frequency (frequency channel). Then, the wireless node 20 transmits the sensor signal using the radio resources allocated to the area to which the wireless node 20 belongs. Specifically, the control unit 250 controls the wireless communication unit 210 to perform the transmission using at least one of the transmission time slot and the frequency channel allocated to the area to which the wireless node 20 belongs. Here, the division of the areas and the allocated radio resources are common to the devices included in the wireless communication system 1, and thus the control unit 250 determines the area to which the wireless node 20 belongs using a common rule to the other wireless nodes 20. The areas can have various shapes such as a triangle, a quadrangle such as a rectangle or a square, a polygon having five or more sides, and a circle. The sizes of the areas may be individually different. For example, the areas may be districts of multiple circles centering on the base station 10.

The control unit 250 may perform carrier sensing. Specifically, the control unit 250 controls the carrier sensing unit 220 to measure a reception level of the wireless signal in the wireless resources allocated to the area to which the wireless node 20 belongs. The control unit 250 suppresses the transmission of the sensor signal based on the measurement result by the carrier sensing unit 220 when the reception level exceeds a predetermined threshold value. The control unit 250 may control the wireless communication unit 210 to transmit the sensor signal by performing backoff control. Specifically, the control unit 250 may wait for transmission for a time according to a random number after confirming empty radio resources through the carrier sensing. When the backoff control is performed and the radio resources are determined to be occupied through the carrier sensing during that time, the transmission of the sensor signal is also suppressed.

In the division of the areas by the wireless communication system 1, there are several conditions to be satisfied, and it is desirable to satisfy the conditions. For example, the following 3 conditions will be listed.

A first condition is that a longest distance between two points included in the area is shorter than a distance at which a collision can be avoided through carrier sensing. In other words, the wireless nodes 20 located at the two points of the longest distance in the area can detect the wireless signals transmitted from the wireless nodes 20. The distance at which a collision can be avoided through carrier sensing is decided according to transmission power and reception characteristics of the wireless node 20. According to this condition, at any position in the area, the wireless node 20 can avoid collision through the carrier sensing between the different wireless nodes 20 included in the same area. Accordingly, packet loss due to collision of the sensor signals is prevented between the wireless nodes 20 included in the same area. Here, even when collision of the sensor signals occurs between the wireless nodes 20 included in the same area, a distance between the wireless nodes 20 is close, and therefore the distances between the base station 10 and the wireless nodes 20 transmitting the sensor signals are identical. Therefore, since the perspective problem is resolved, the base station 10 can separate the sensor signals through a despreading process and acquire the measurement data.

A second condition is that the area is included in a group formed by a plurality of areas included in a cell administrated by the base station 10 and radio resources not overlapping the other areas included in the same group are allocated to the area. According to this condition, the radio resources to be allocated are different in the cell administrated by one base station 10 when the areas are different. When collision of the sensor signals from the wireless nodes 20 belonging to the different areas occurs, a reception power difference caused due to a distance difference between the base stations 10 occurs between the sensor signals, and thus one of the reception powers is treated as noise and packet loss can occur. According to the present condition, such packet loss is prevented since the collision of the sensor signals using the same radio resources does not occur in transmission between the wireless nodes 20 included in the different areas. Since the same radio resources can be permitted to be reused between different groups, the wireless communication system 1 can effectively utilize the radio resources. Various methods of allocating the radio resources not overlapping with the other areas included in the same group are considered. For example, a transmission time slot, a frequency channel, or a combination of the transmission time slot and the frequency channel can be allocated not to overlap with the other areas included in the same group.

A third condition is that a distance between the areas which are included in the different groups and to which the same radio resources are allocated is longer than the distance at which a collision can be avoided through the carrier sensing. A distance to the base station 10, a direction viewed from the base station 10, a radio-wave environment, or the like can be different between the areas which are included in the different groups and to which the same radio resources are allocated. When the base station 10 covering a group is assumed to be provided for each group, the sensor signals from the wireless nodes 20 belonging to the areas which are included in the different groups and to which the same radio resources are allocated are assumed to be received at different reception levels in the base stations 10. In this case, the sensor signals transmitted from the wireless nodes 20 are received by the base stations 10 administrating cells (groups) to which the base stations 10 belong, and the sensor signals do not reach the other base stations 10 or the perspective problem is cancelled. Therefore, overlap of the measurement data in the management server 30 is spontaneously prevented. Therefore, the wireless nodes 20 belonging to the areas which are included in the different groups and to which the same radio resources are allocated are prevented from suppressing unnecessary transmission.

(6) Storage Unit 260

The storage unit 260 stores various kinds of information used in the wireless node 20. For example, the storage unit 260 stores information indicating the division of the areas in the wireless communication system 1 and the radio resources allocated for each area. This information is assumed to be common to all of the wireless nodes 20 included in the wireless communication system 1. The number of kinds of allocation of the radio resources may be plural. For example, the control unit 250 may switch the kinds of allocation to be used based on an instruction from the base station 10, or the kinds of allocation to be used may be decided in advance.

(7) Positional Information Acquisition Unit 270

The positional information acquisition unit 270 has a function of acquiring positional information indicating the position of the wireless node 20. For example, the positional information acquisition unit 270 receives radio waves from a Global Positioning System (GPS) satellite, detects a position at which the wireless node 20 is located, and outputs the detected positional information. The positional information acquisition unit 270 may acquire time information indicating a so-called GPS time from the GPS satellite. The positional information acquisition unit 270 is an example of a positional information acquisition unit that detects the position of the base station 10 based on a signal acquired from the outside, and an example of the positional information acquisition unit according to the embodiment is not limited thereto. For example, the position information acquisition unit may detect the position through transmission to and reception from Wi-Fi, a mobile phone, a PHS, or a smartphone, short-range communication, or the like. The positional information acquisition unit 270 outputs the acquired information to the control unit 250.

The example of the internal configuration of the wireless node 20 according to the embodiment has been described. Next, an operation process by the wireless communication system 1 according to the embodiment will be described with reference to FIGS. 5 to 7.

[2-3. Operation Process]

Figure 5:
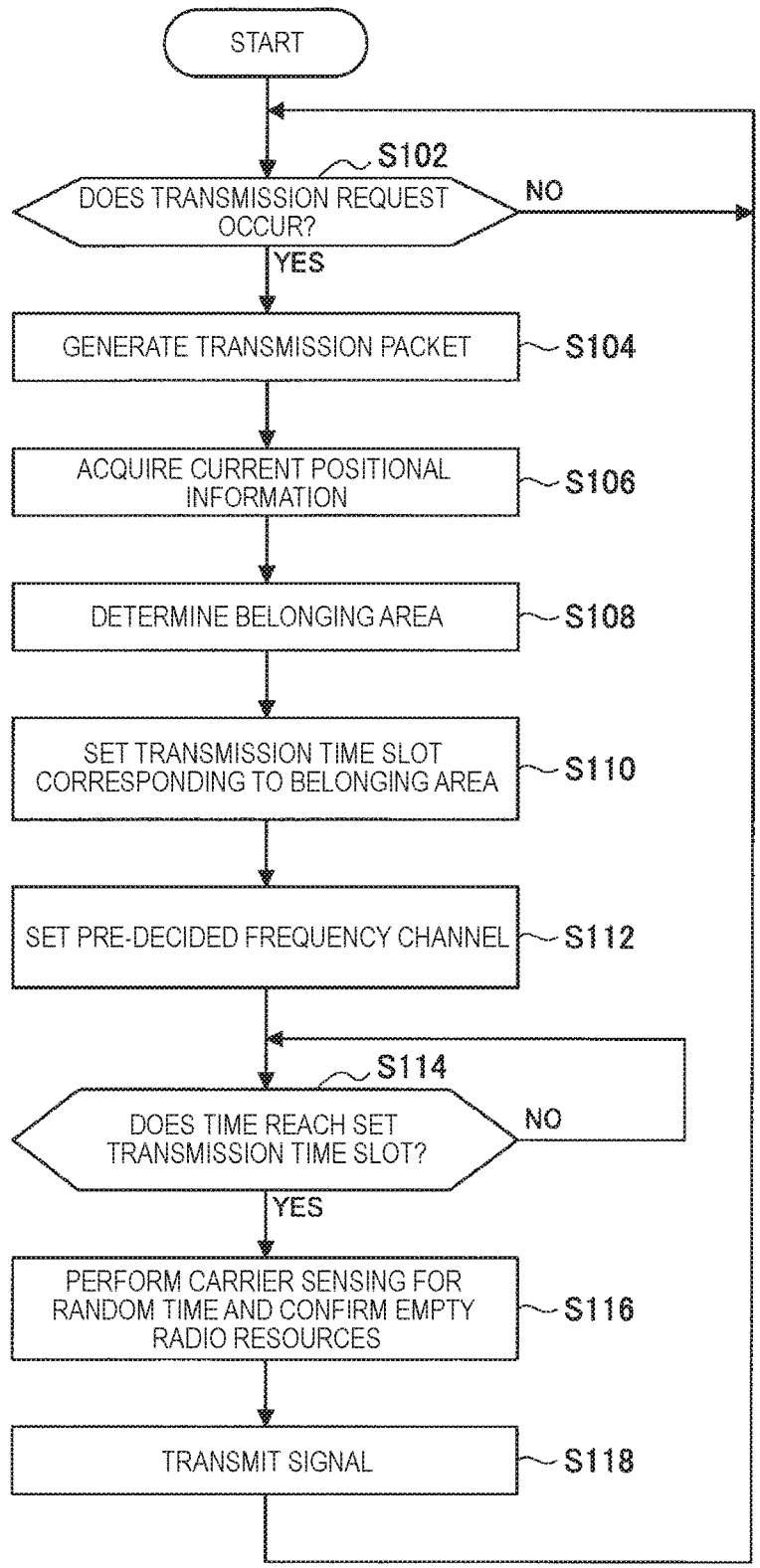
FIG. 5 is a flowchart showing an example of the flow of a sensor signal transmission process performed in the wireless node according to the first embodiment.

FIG. 5 is a flowchart showing an example of the flow of a sensor signal transmission process performed in the wireless node 20 according to the embodiment. As shown in FIG. 5, in step S102, the wireless node 20 first determines whether a transmission request occurs. For example, the control unit 250 determines that the transmission request occurs, for example, when the sensor unit 230 acquires the measurement data or the capacity of the acquired measurement data exceeds a threshold value. When the control unit 250 determines that no transmission request occurs (NO in S102), the process returns to step S102.

When the control unit 250 determines that the transmission request occurs (YES in S102), the wireless node 20 generates a transmission packet in step S104. Specifically, the data processing unit 240 generates the packet which has a fixed length and in which identification information of the base station 10 is added to the measurement data acquired by the sensor unit 230. The generated packet is output to the modulation unit 214. Here, the modulation unit 214 does not immediately move to a transmission operation but waits for an instruction from the control unit 250.

Subsequently, in step S106, the wireless node 20 acquires current positional information. For example, the positional information acquisition unit 270 acquires the positional information indicating the current position of the wireless node 20. The positional information acquisition unit 270 may acquire time information from the GPS. In other wireless nodes 20, it is assumed that time information is similarly acquired by the GPS and the time information is synchronized in all of the wireless nodes 20.

Next, in step S108, the wireless node 20 determines the area to which the wireless node 20 belongs. For example, based on the positional information acquired by the positional information acquisition unit 270, the control unit 250 determines to which area the wireless node 20 belongs in accordance with the following calculation method.

First, the control unit 250 clusters a longitude and a latitude indicated by the acquired positional information to respective values by a floor function which is expressed as an example in the following equation 1 and represents values of a certain range as one value.

[Math. 1]

$$X = \lfloor Longitude * 10000 \rfloor$$

$$Y = \lfloor Latitude * 10000 \rfloor \quad \text{(Equation 1)}$$

An error of the GPS is absorbed through the clustering, and thus the wireless nodes 20 clustered to the same values can use the same radio resources. Based on the transmission power, the reception characteristics, or the like of each wireless node 20, the granularity of the clustering is set to be less than a distance (a distance in which the carrier sensing is possible) in which the radio waves between the wireless nodes 20 can be detected under the foregoing first condition. In the clustering of the longitude, a relation between an actual distance and a longitude difference depends on the latitude. Therefore, the control unit 250 may correct a gap between the actual distance and the longitude difference by causing the granularity of the clustering of the longitude to be variable according to the latitude in the foregoing equation 1.

The process of step S108 has been described above. Subsequently, the wireless node 20 sets the radio resources in accordance with the clustered longitude X and latitude Y calculated by the foregoing equation 1. In the embodiment, an example in which the transmission time slot is allocated as the radio resources to each area will be described.

Specifically, in step S110, the wireless node 20 sets the transmission time slot corresponding to the belonging area. For example, the control unit 250 sets the transmission time slot using the following equation 2 in accordance with the clustered longitude X and latitude Y calculated by the foregoing equation 1. A time zone is assumed to be common to the base station 10 and each wireless node 20 included in the wireless communication system 1.

[Math. 2]

$$t_{TX}(n,X,Y) = 36*n + X \bmod 6 + 6*(Y \bmod 6) \quad \text{(Equation 2)}$$

The foregoing equation 2 expresses an n-th transmission start time $t_{TX}(n, X, Y)$ in the area of the longitude X and the latitude Y when a geographical space is divided into 36 areas per group and different transmission time slots are allocated to the areas. From another viewpoint, a form in which 36 transmission time slots are repeated as one unit (superframe) is assumed in the foregoing equation 2. Here, n is any integer and a unit of a transmission start time $t_{TX}(n, X, Y)$ can be, for example, any unit such as seconds or milliseconds. Based on the size of the cell 11 administrated by the base station 10, the size of the area, the transmission power, and the reception characteristics, or the like of the wireless node 20, the number of areas included in one group is set so that the foregoing third condition is satisfied. Here, an example of allocation of the transmission time slots expressed by the foregoing equation 2 will be described with reference to FIGS. 6 and 7.

Figure 6:
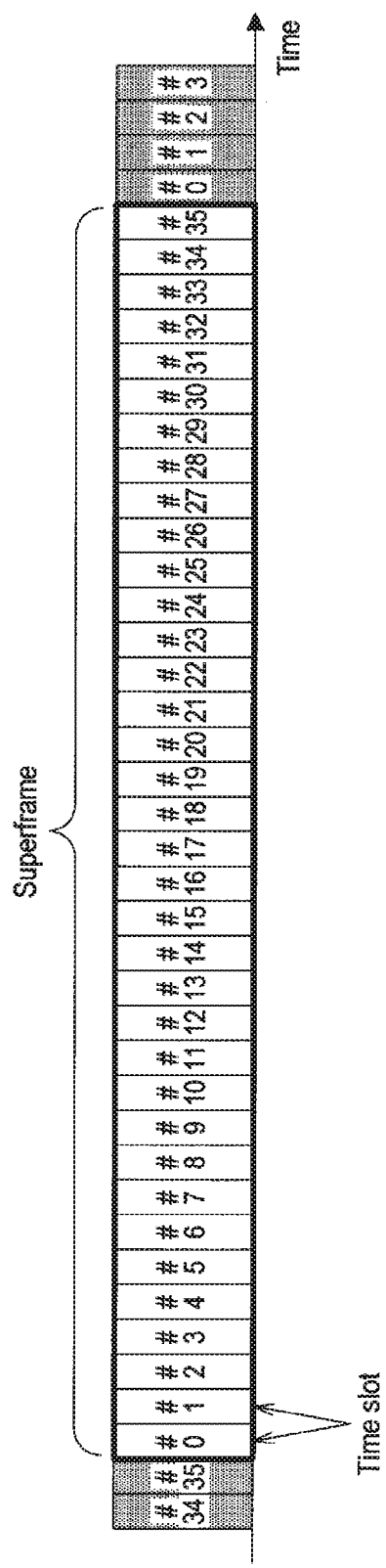
FIG. 6 is an explanatory diagram showing an example of allocation of radio resources according to the first embodiment.

FIG. 6 is an explanatory diagram showing the example of allocation of radio resources according to the embodiment. FIG. 6 shows a relation between the transmission time slots expressed in the foregoing equation 2 and the superframe. As shown in FIG. 6, 36 transmission time slots are repeated as one superframe. For example, a start point of the superframe is set to the beginning of each hour (00:00, 01:00, 02:00, etc.) and the width of the transmission time slot is set to 1 second. The control unit 250 selects a minimum of n satisfying $t_{current} < t_{TX}(n, X, Y)$ in $t_{TX}(n, X, Y)$ when $t_{current}$ is an elapsed time from a superframe start point of a current time. Then, the control unit 250 sets a slot after $t_{TX}(n, X, Y)$ seconds from the superframe start point as a transmission time slot to be used to transmit the sensor signal.

Figure 7:
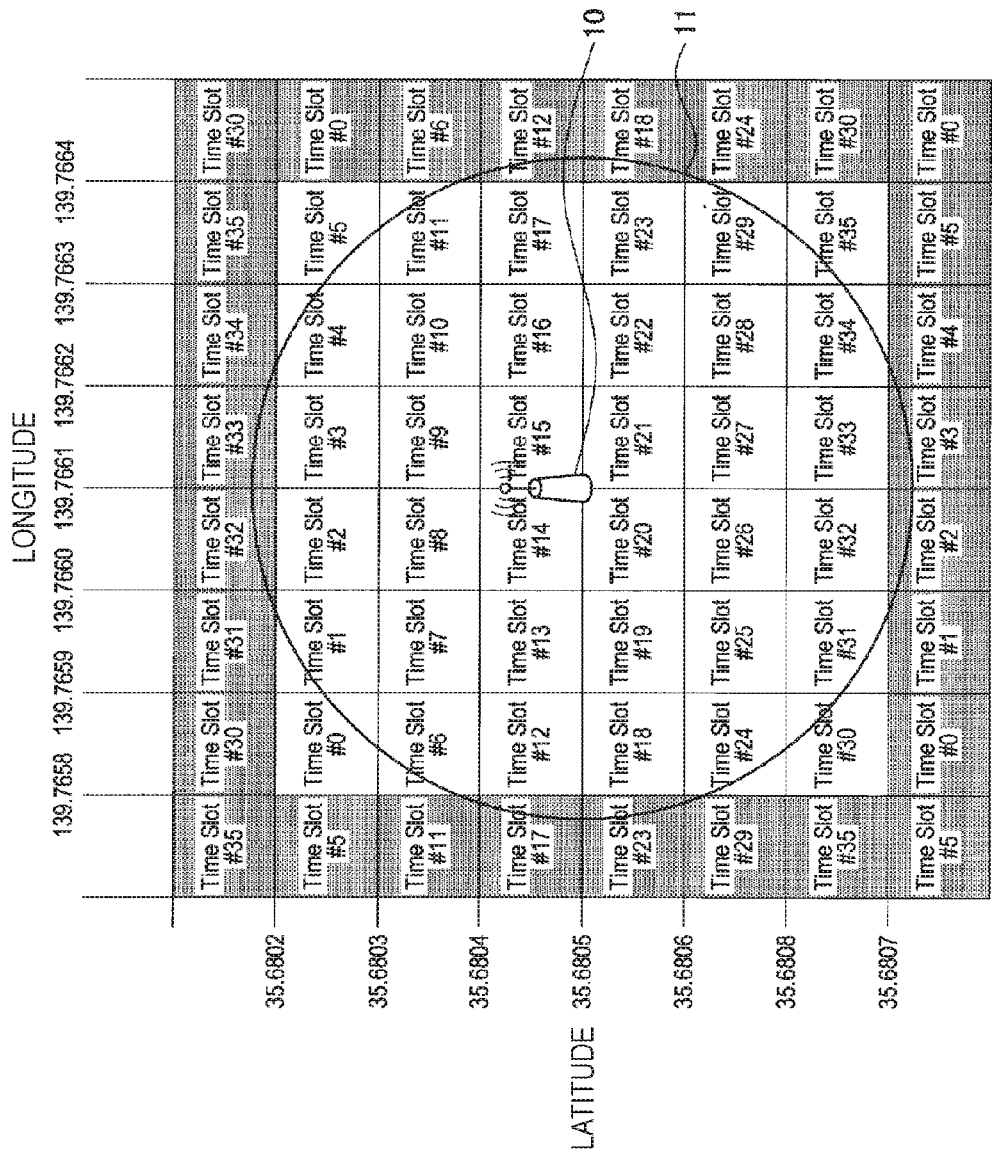
FIG. 7 is an explanatory diagram showing an example of allocation of radio resources according to the first embodiment.

FIG. 7 is an explanatory diagram showing an example of allocation of radio resources according to the first embodiment. FIG. 7 shows a relation between the transmission time slots and the areas indicated by the latitude and the longitude expressed in the foregoing equation 2. As shown in FIG. 7, a geographical space is divided into a plurality of areas and one group is formed by 36 areas to which transmission time slots (Time Slots) #0 to #35 are allocated. The cell 11 administrated by the base station 10 covers one group. In this allocation example, the above-described first to third conditions are assumed to be satisfied. For example, two wireless nodes 20 located at diagonal vertexes of the area of transmission time slot #1 can detect the wireless signals transmitted from the mutual wireless nodes 20 (the first condition). As shown in FIG. 7, the transmission time slot allocated to each area is allocated not to overlap with the other areas included in the same group (the second condition). For example, a distance between the areas of transmission time slot #0 is a distance at which the wireless nodes 20 belonging to these areas may not detect the wireless signals transmitted from the mutual wireless nodes 20 (the third condition).

The clustering of the geographical space and the calculation rule for the allocation of the transmission time slots to the areas, as expressed in the foregoing equations 1 and 2, are assumed to be common to all of the wireless nodes 20 included in the wireless communication system 1. In accordance with the calculation rule, the control unit 250 sets the same transmission time slot as the wireless node 20 located in the same area, that is, located nearby, so that the transmission time slot is used to transmit the sensor signal.

Next, in step S112, the wireless node 20 sets the pre-decided frequency channel so that the frequency channel is used to transmit the sensor signal. For example, the control unit 250 sets the pre-decided frequency channels with reference to the storage unit 260. The frequency channels may be common to all of the wireless nodes 20 included in the wireless communication system 1 or may be different.

Subsequently, in step S114, the wireless node 20 determines whether the current time is the set transmission time slot. When the wireless node 20 determines that the current time has not yet reached the transmission time slot (NO in S114), the process returns to step S114. When the wireless node 20 determines that the current time reaches the transmission time slot (YES in S114), the wireless node 20 performs the carrier sensing for a random time and confirms the empty radio resources in step S116. Specifically, the carrier sensing unit 220 measures the reception level in the frequency channel set in the foregoing step S112 and performs the backoff control to confirm the empty radio resources for a random time of a certain range.

In step S118, the wireless node 20 transmits the sensor signal. Specifically, the control unit 250 confirms the emptiness in the set frequency channel in accordance with the measurement result output from the carrier sensing unit 220, and subsequently instructs the wireless communication unit 210 to transmit the sensor signal. The modulation unit 214 first receives the instruction from the control unit 250 and performs data modulation and encoding on the packet output from the data processing unit 240. Subsequently, the modulation unit 214 performs spread modulation using the spread code unique to each wireless node 20. Then, the modulation unit 214 multiplies carrier waves of the channel, performs power amplification, and transmits the sensor signal from the antenna. The wireless node 20 finishing the transmission may pause the process to save power consumption until a subsequent transmission request is issued.

The example of the flow of the sensor signal transmission process performed in the wireless node 20 has been described above. Next, a process in which the base station 10 receives the signal transmitted in this way will be described.

The base station 10 normally waits to receive the sensor signal from the wireless node 20. The demodulation unit 114 of the base station 10 can receive the plurality of frequency channels in parallel and can perform the despreading process in parallel in accordance with the plurality of kinds of spread codes. Here, the base station 10 can specify the areas to which the wireless nodes 20 transmitting the sensor signal every time belong by sharing the calculation rule of the transmission time slots in the wireless nodes 20. Therefore, the control unit 140 of the base station 10 may control the wireless communication unit 110 such that directivity of the reception antenna is formed in a direction in which the sensor signals are predicted to arrive. Accordingly, it is possible to improve the reception characteristics of the base station 10.

The base station 10 restores the measurement data by performing the despreading on the received wireless signal in accordance with the spread code unique to each wireless node 20. Then, the base station 10 transmits the measurement data to the management server 30 via the backbone communication path 40. When the number of base stations 10 is plural, the above-described process is performed similarly in each base station 10. There is a possibility of the same sensor signal being received in the plurality of base stations 10, but the management server 30 destroys the duplicated sensor signals with reference to the identification information of the base station 10 associated with the collected measurement data.

[2-4. Advantageous Effects]

When transmission requests simultaneously occur in the plurality of wireless nodes 20 belonging to the same area, the sensor signals are simultaneously transmitted by the wireless nodes 20. Here, since the granularity of the clustering of the areas falls within a range in which carrier sensing detection is possible under the foregoing first condition, it is ensured that the wireless nodes 20 capable of simultaneously transmitting the sensor signals do not have the relation of the mutual hidden terminal. Accordingly, the wireless nodes 20 can avoid a case in which the transmissions of the sensor signals overlap and collision occurs by performing the carrier sensing for a random time. Reversely, since the wireless nodes 20 having the relation of the positional relation of the hidden terminal belong to different areas and use different transmission time slots, the collision is avoided.

However, the random time may be matched, and there is a possibility of the plurality of sensor signals colliding in the base station 10. However, when the wireless nodes 20 belong to the same area, there is no large difference in the distance to the base station 10. Thus, a large Difference does not occur in each reception intensity in the base station 10. Accordingly, since the so-called perspective problem does not occur, the base station 10 can acquire each piece of Measurement data by performing the despreading process using the spread code unique to each Wireless node 20.

The wireless node 20 included in the wireless communication system 1 performs the above-described processes, and thus can reduce power consumption of the wireless node 20 while preventing packet loss. Specifically, the wireless node 20 can reduce the collision of the sensor signals without transmitting and receiving a control message to and from the base station 10 and can also restore the measurement data in the base station 10 and reduce a packet loss probability even when the collision occurs. Since it is not necessary for the wireless node 20 to transmit and receive the control message to and from the base station 10, it is possible to simplify the reception function and it is possible to reduce the power consumption.

[2-5. Modification Examples]

The example in which the wireless communication system 1 realizes the multiple access at the time of collision in accordance with the CDMA technology has been described above, but the present technology is not limited thereto. For example, the wireless communication system 1 may realize the multiple access at the time of collision in accordance with the orthogonal frequency division multiple access (OFDMA). Specifically, the modulation unit 214 may perform sub-carrier modulation on the sensor signals using sub-channels allocated to the wireless nodes 20. In this case, the base station 10 can separate the sensor signals transmitted from the wireless nodes 20 through subcarrier demodulation and acquire the sensor signals.

<3. Second Embodiment>

This embodiment is an example in which a different frequency channel is allocated to each area when radio resources are allocated to the areas. Hereinafter, an operation process of the wireless communication system 1 according to the embodiment will be described with reference to FIGS. 8 and 9.

Figure 8:
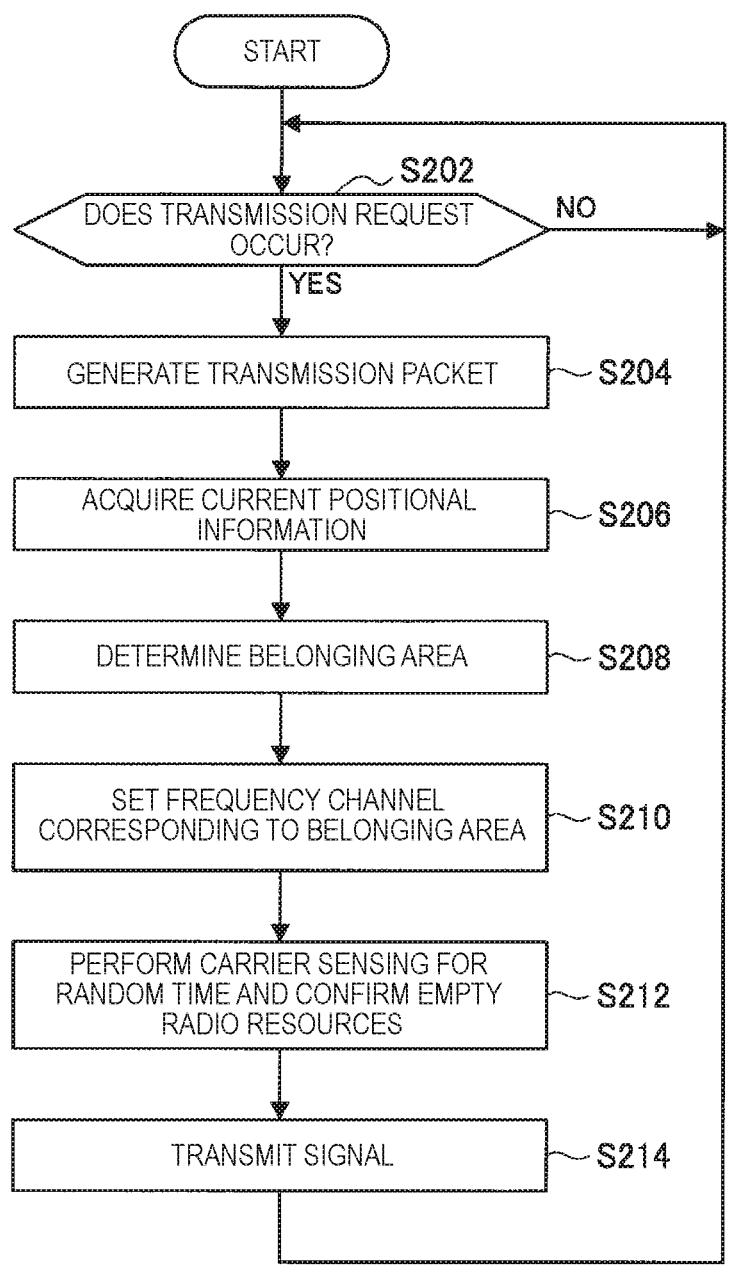
FIG. 8 is a flowchart showing an example of the flow of a sensor signal transmission process performed in a wireless node according to a second embodiment.

FIG. 8 is a flowchart showing an example of the flow of a sensor signal transmission process performed in the wireless node 20 according to the embodiment. Referring to FIG.

8, a process of step S210 is different from the process shown in FIG. 5. Accordingly, factors of the different process will be described in detail below.

As shown in FIG. 8, the wireless node 20 first generates a transmission packet in step S204 using occurrence of a transmission request in step S202 as a trigger. Subsequently, the wireless node 20 acquires current positional information in step S206 and determines a belonging area in step S208.

Subsequently, in step S210, the wireless node 20 sets the frequency channel to be used to transmit the sensor signal in accordance with the clustered longitude X and latitude Y calculated by the foregoing equation 1. Specifically, the control unit 250 sets the frequency channel to be used using the following equation 3.

[Math. 3]

$$F = X \bmod 6 + 6*(Y \bmod 6) \quad \text{(Equation 3)}$$

Here, F indicates a number of the frequency channel. The control unit 250 sets the frequency channels corresponding to the numbers F as the frequency channels to be used to transmit the sensor signals. For example, the control unit 250 performs reconversion and setting so that the foregoing calculated numbers F have a one-to-one correspondence with actual frequency channel numbers in conformity with a radio law of a territory in which the wireless communication system 1 is used. Here, a relation between the areas and the allocation of the frequency channels will be described with reference to FIG. 9.

Figure 9:
FIG. 9 is an explanatory diagram showing an example of allocation of radio resources according to the second embodiment.

FIG. 9 is an explanatory diagram showing an example of allocation of radio resources according to the embodiment. As shown in FIG. 9, a geographical space is divided into a plurality of areas and one group is formed by 36 areas to which frequency channels (Channels) #0 to #35 are allocated. Here, the frequency channels allocated to the areas are allocated so that the frequency channels do not overlap with the other areas included in the same group. In the allocation example, as in the example shown in FIG. 7, the above-described first to third conditions are assumed to be satisfied.

A calculation rule of the allocation of the frequency channels to the areas, as expressed in the foregoing equation 3, is assumed to be common to all of the wireless nodes 20 included in the wireless communication system 1. In accordance with the calculation rule, the control unit 250 sets the same frequency channel as the wireless node 20 located in the same area, that is, located nearby, so that the frequency channel is used to transmit the sensor signal. In the embodiment, the allocation of the transmission time slots described in the first embodiment is not performed. Therefore, the control unit 250 can set any transmission start time.

The process of step S210 has been described above. Subsequently, in step S212, the wireless node 20 performs the carrier sensing for a random time and confirms the empty radio resources. In the embodiment, the wireless node 20 can set any transmission start time. Therefore, for example, the carrier sensing may start immediately after the foregoing step S208. The carrier sensing unit 220 measures the reception level in the frequency channel set in the foregoing step S210 and performs the backoff control to confirm the empty radio resources for a random time of a certain range. In step S214, the wireless node 20 transmits the sensor signal.

The processes in the base station 10 are the same as those of the foregoing first embodiment. Here, the base station 10 can specify the areas to which the wireless nodes 20 transmitting the sensor signal at every frequency belong by sharing the calculation rule of the frequency channels in the wireless nodes 20. Therefore, for example, the control unit 140 of the base station 10 may control the wireless communication unit 110 such that directivity of the reception antenna is formed in a direction in which the sensor signals are predicted to arrive. Accordingly, it is possible to improve the reception characteristics of the base station 10.

In the wireless communication system 1 according to the above-described embodiment, as in the above-described first embodiment, the wireless nodes 20 belonging to the same area commonly use the different radio resources from the other areas belonging to the same group. Therefore, even in the embodiment, the collision of the sensor signals is avoided through the carrier sensing, and the base station 10 can acquire each piece of measurement data even when the collision occurs. Accordingly, the wireless communication system 1 according to the embodiment can reduce the power consumption of the wireless node 20 while preventing the packet loss, as in the above-described first embodiment.

[4. Third Embodiment]

This embodiment is an example in which a combination of a different transmission time slot and a different frequency channel is allocated to each area when radio resources are allocated to the areas. Hereinafter, an operation process of the wireless communication system 1 according to the embodiment will be described with reference to FIGS. 10 to 12.

Figure 10:
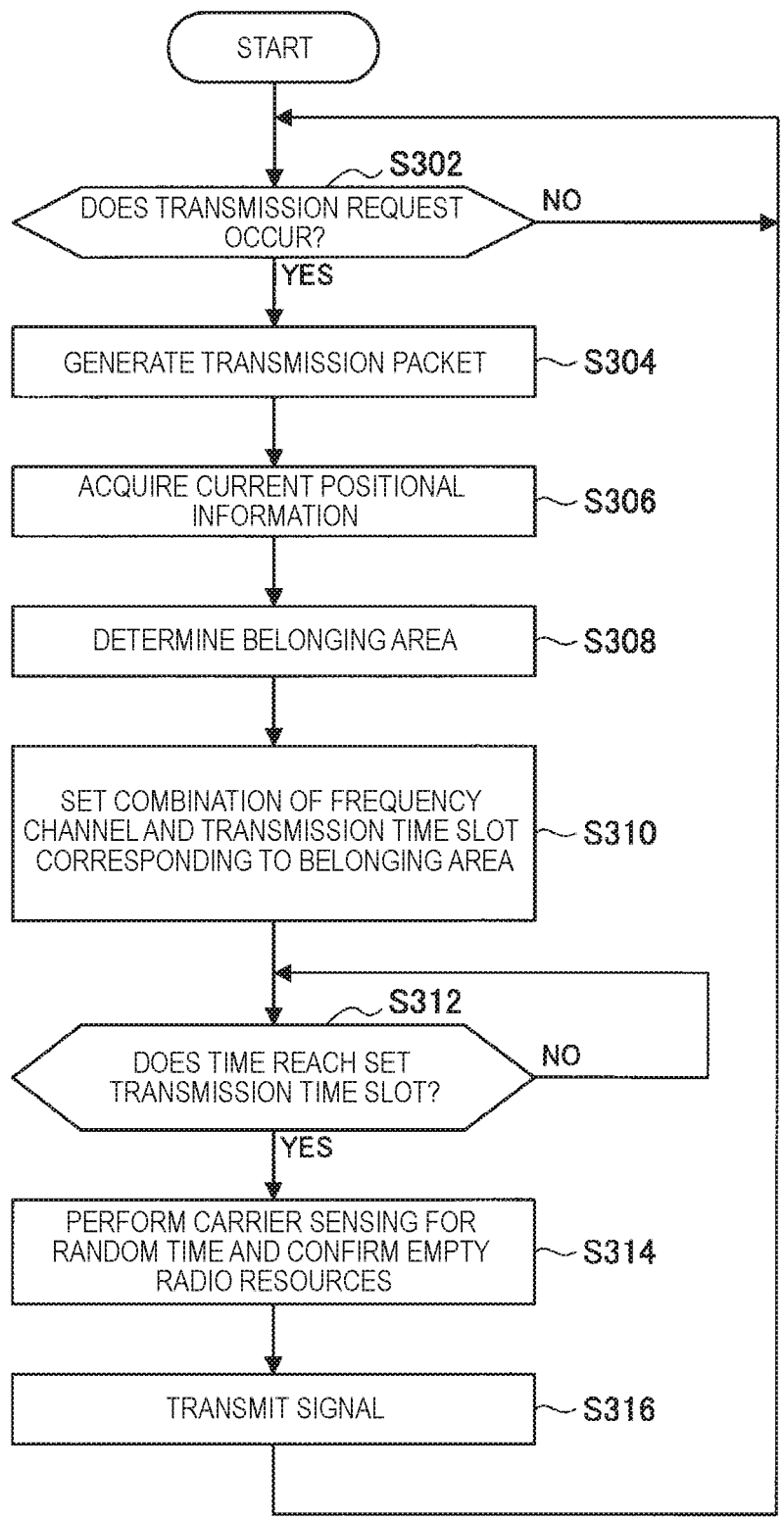
FIG. 10 is a flowchart showing an example of the flow of a sensor signal transmission process performed in a wireless node according to a third embodiment.

FIG. 10 is a flowchart showing an example of the flow of a sensor signal transmission process performed in the wireless node 20 according to the embodiment. Referring to FIG. 10, a process of step S310 is different from the process shown in FIG. 5. Accordingly, factors of the different process will be described in detail below.

As shown in FIG. 10, the wireless node 20 first generates a transmission packet in step S304 using occurrence of a transmission request in step S302 as a trigger. Subsequently, the wireless node 20 acquires current positional information in step S306 and determines a belonging area in step S308.

Subsequently, in step S310, the wireless node 20 sets the combination of the transmission time slot and the frequency channel to be used to transmit the sensor signal in accordance with the clustered longitude X and latitude Y calculated by the foregoing equation 1. For example, the control unit 250 sets the transmission time slot and the frequency channel to be used using the following equations 4 and 5.

[Math. 4]

$$t_{TX}(n) = 9*n + X\bmod 3 + 3*(Y\bmod 3) \quad \text{(Equation 4)}$$

[Math. 5]

$$F = \left\lfloor \frac{X}{3} \right\rfloor \bmod 2 + 2*\left(\left\lfloor \frac{Y}{3} \right\rfloor \bmod 2\right) \quad \text{(Equation 5)}$$

The foregoing equations 4 and 5 express calculation rules when a geographical space is divided into 36 areas per group and combinations of 4 frequency channels and 9 transmission time slots are allocated to the areas. In the foregoing equation 4, an n-th transmission start time $t_{TX}(n, X, Y)$ in the area of the longitude X and the latitude Y is calculated. In the foregoing equation 4, a form in which 9 transmission time slots are repeated as one unit (superframe) is assumed. Here, n is any integer and a unit of a transmission start time $t_{TX}(n, X, Y)$ can be, for example, any unit such as seconds or milliseconds. F calculated from the foregoing equation 5 indicates a number of the frequency channel. The control unit 250 sets the frequency channels corresponding to the numbers F as the frequency channels to be used to transmit the sensor signals. For example, the control unit 250 performs reconversion and setting so that the foregoing calculated numbers F have a one-to-one correspondence with actual frequency channel numbers in conformity with a radio law of a territory in which the wireless communication system 1 is used. Here, an example of allocation of the radio resources expressed by the foregoing equations 4 and 5 will be described with reference to FIGS. 11 and 12.

Figure 11:
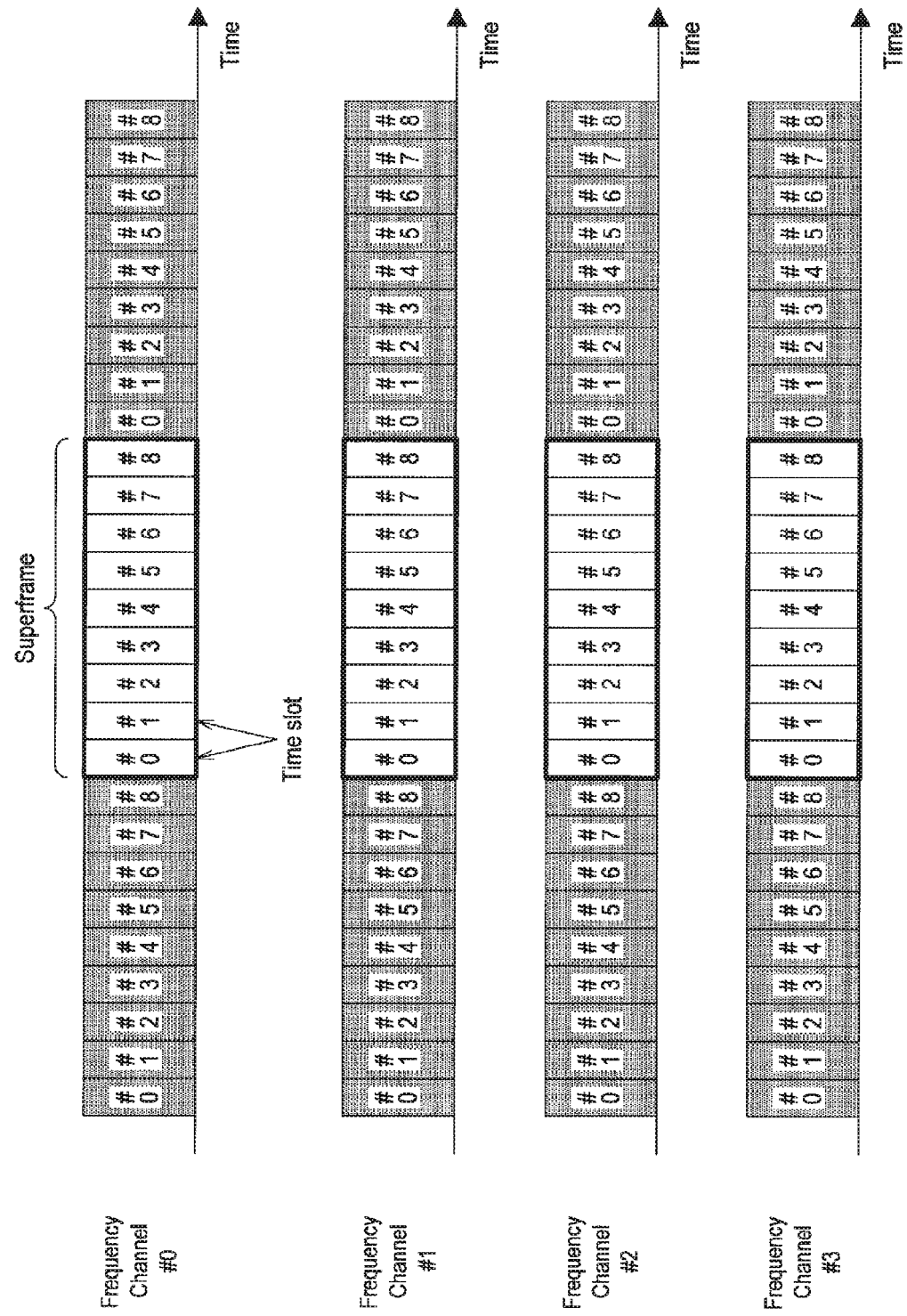
FIG. 11 is an explanatory diagram showing an example of allocation of radio resources according to the third embodiment.

FIG. 11 is an explanatory diagram showing an example of allocation of radio resources according to the embodiment. FIG. 11 shows a relation between the transmission time slots set in the foregoing equation 4 and the superframe at each frequency channel set by the foregoing equation 5. As shown in FIG. 11, 9 transmission time slots are repeated as one superframe.

Figure 12:
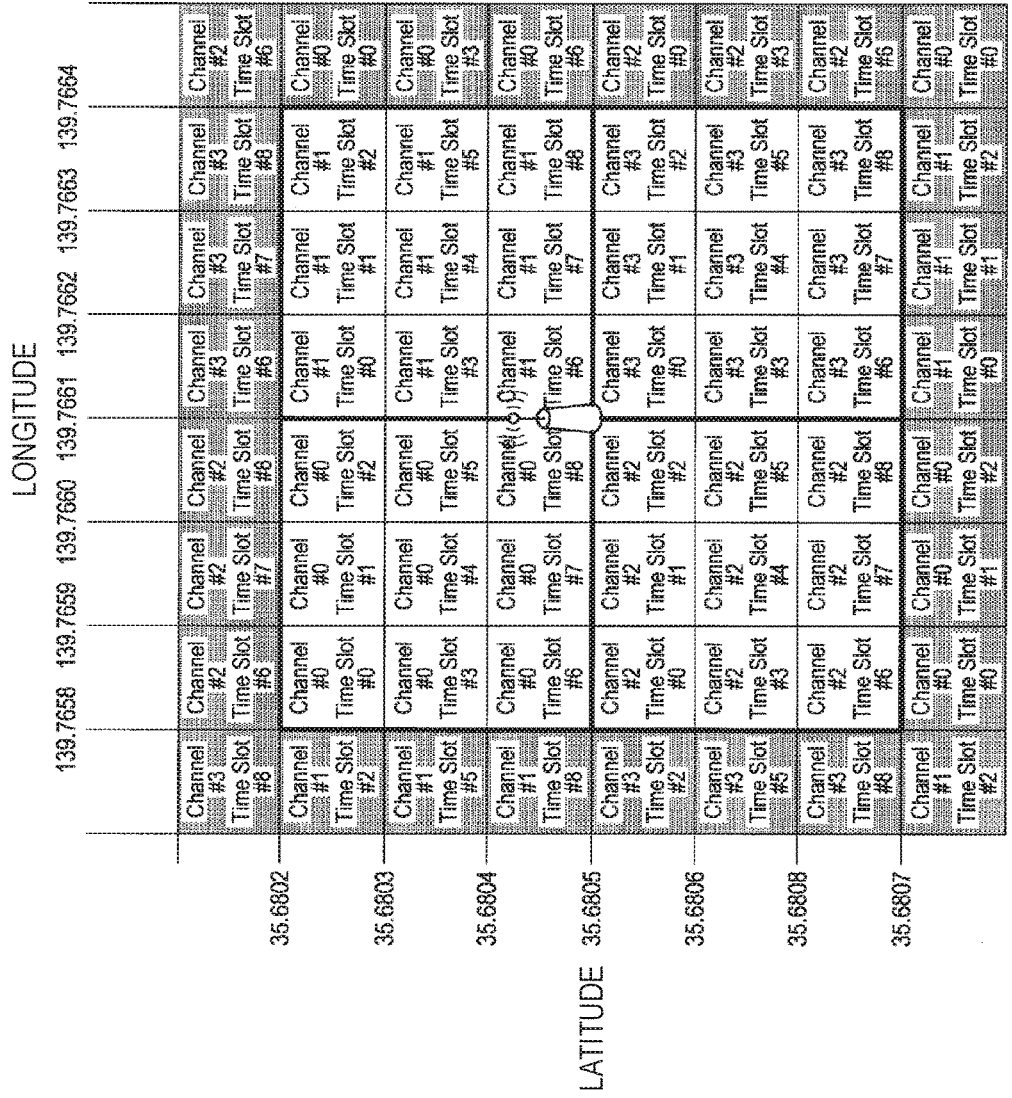
FIG. 12 is an explanatory diagram showing an example of allocation of radio resources according to the third embodiment.

FIG. 12 is an explanatory diagram showing an example of allocation of radio resources according to the embodiment. As shown in FIG. 12, a geographical space is divided into a plurality of areas and one group is formed by 36 areas to which transmission time slots #0 to #8 are allocated in each of the 4 regions to which frequency channels #0 to #3 are allocated. Here, the combination of the transmission time slot and the frequency channel allocated to each area are allocated so that the combination of the transmission time slot and the frequency channel do not overlap with the other areas included in the same group. In the allocation example, as in the example shown in FIG. 7, the above-described first to third conditions are assumed to be satisfied.

A calculation rule of the allocation of the radio resources to the areas, as expressed in the foregoing equations 4 and 5, is assumed to be common to all of the wireless nodes 20 included in the wireless communication system 1. In accordance with the calculation rule, the control unit 250 sets the same transmission time slot and the same frequency channel as the wireless node 20 located in the same area, that is, located nearby, so that the transmission time slot is used to transmit the sensor signal.

The process of step S310 has been described above. Subsequently, in step S312 and S314, the wireless node 20 performs the carrier sensing for a random time and confirms the empty radio resources when the current time reaches the set transmission time slot, as in steps S114 and S116 described above with reference to FIG. 5. In step S316, the wireless node 20 transmits the sensor signal as in step S118 described above with reference to FIG. 5.

The processes in the base station 10 are the same as those of the foregoing first embodiment. Here, the base station 10 can specify the areas to which the wireless nodes 20 transmitting the sensor signal at every time and frequency belong by sharing the calculation rule of the radio resources in the wireless nodes 20. Therefore, for example, the control unit 140 of the base station 10 may control the wireless communication unit 110 such that directivity of the reception antenna is formed in a direction in which the sensor signals are predicted to arrive. Accordingly, it is possible to improve the reception characteristics of the base station 10.

In the wireless communication system 1 according to the above-described embodiment, as in the above-described first embodiment, the wireless nodes 20 belonging to the same area commonly use the different radio resources from the other areas belonging to the same group. Therefore, even in the embodiment, the collision of the sensor signals is avoided through the carrier sensing, and the base station 10 can acquire each piece of measurement data even when the collision occurs. Accordingly, the wireless communication system 1 according to the embodiment can reduce the power consumption of the wireless node 20 while preventing the packet loss, as in the above-described first embodiment.

In the above-described example, the allocation of the radio resources is realized by the 36 combinations of the 9 transmission time slots and the 4 frequency channels. Therefore, the technology related to the embodiment is particularly useful when the number of transmission time slots and the number of frequency channels which can be allocated to all of the areas included in the cell administrated by the base station 10 may not be guaranteed. When FIGS. 6 and 11 are compared, in the embodiment, the number of areas in which the belonging wireless nodes 20 can transmit the sensor signals per unit time is larger than in the first embodiment. That is, in the embodiment, it is possible to increase chances to transmit the sensor signals more than in the first embodiment while avoiding the hidden terminal problem. Therefore, more efficient utilization of the radio resources can be realized.

<5. Application Examples>

The technology according to the present disclosure can be applied to various products. For example, the wireless node 20 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation apparatuses. Further, the wireless node 20 may be realized as terminals (also referred to as machine type communication (MTC) terminals) which perform machine to machine (M2M) communication, such as smart meters, vending machine, remote monitoring apparatuses and point of sale (POS) terminals. Furthermore, the wireless node 20 may be wireless communication modules mounted in such terminals (for example, integrated circuit modules configured in one die).

For example, the base station 10 may be realized as a wireless LAN access point (which is also referred to as a wireless base station) that has no router function or has a router function. The base station 10 may be realized as a mobile wireless LAN router. Furthermore, the base station 10 may be wireless communication modules mounted in such devices (for example, integrated circuit modules configured in one die).

[5-1. First Application Example]

Figure 13:
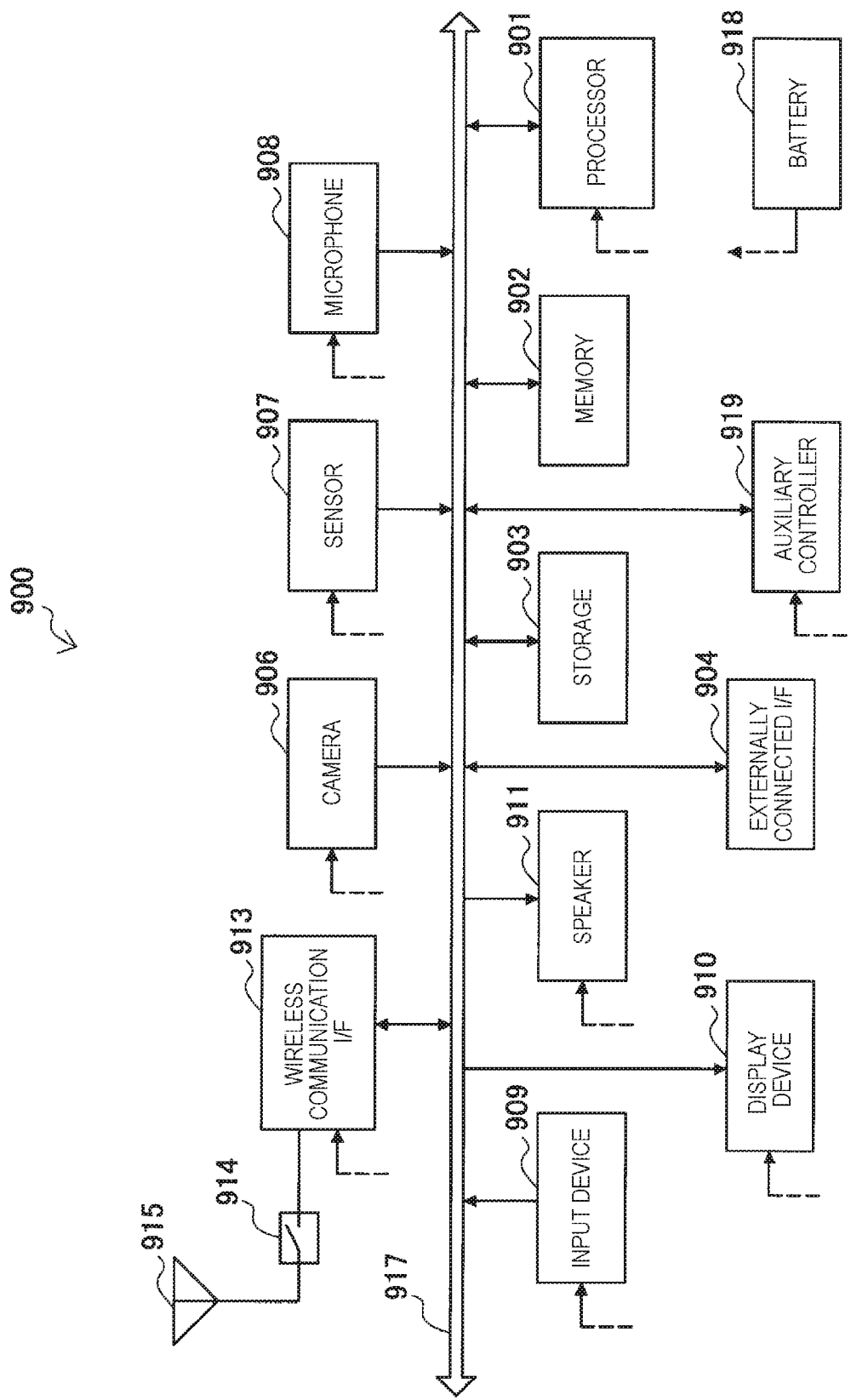
FIG. 13 is a block diagram showing an example of a schematic configuration of a smartphone.

FIG. 13 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has an image sensor, for example, a charge coupled device (CCD) or a complementary metal oxide semiconductor (CMOS) to generate captured images.

The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad to execute the wireless LAN communication. The wireless communication interface 913 can communicate with another apparatus via a wireless LAN access point in an infrastructure mode. In addition, the wireless communication interface 913 can directly communicate with another apparatus in a direct communication mode such as an ad hoc mode, Wi-Fi Direct, or the like. Wi-Fi Direct (registered trademark) is different from the ad hoc mode, and thus one of two terminals operates as an access point. However, communication is performed directly between the terminals. The wireless communication interface 913 can typically include a baseband processor, a radio frequency (RF) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 13. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 13 via power supply lines partially indicated by dashed lines in the drawing. The auxiliary controller 919 causes, for example, required minimum functions of the smartphone 900 to be operated in a sleep mode.

The smartphone 900 shown in FIG. 13 can operate as the wireless node 20. In this case, for example, the wireless communication unit 210, the carrier sensing unit 220, the sensor unit 230, the data processing unit 240, the control unit 250, and the storage unit 260 shown in FIG. 4 may be mounted on the wireless communication interface 913. At least some of the functions may be mounted on the processor 901 or the auxiliary controller 919. Thus, the smartphone 900 can transmit the sensor signal using the radio resources appropriate for realizing the suppression of the packet loss in the base station without necessarily transmitting and receiving a control message. The smartphone 900 can reduce the power consumption of the battery 918 by selecting the appropriate radio resources based on the positional information.

The smartphone 900 may operate as a wireless access point (software AP) when the processor 901 performs an access point function at an application level. The wireless communication interface 913 may have the wireless access point function.

[5-2. Second Application Example]

Figure 14:
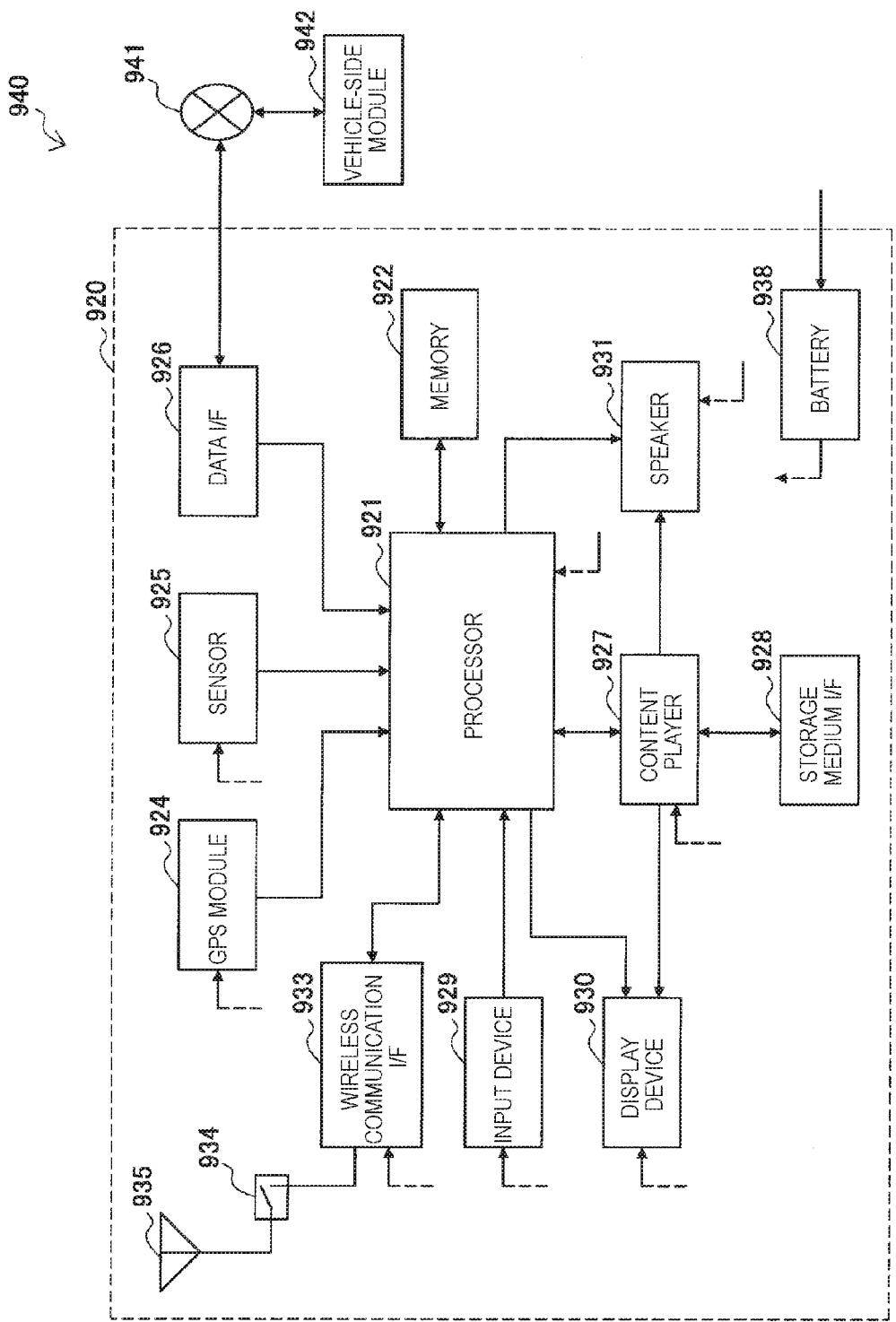
FIG. 14 is a block diagram showing an example of a schematic configuration of a car navigation device.

FIG. 14 is a block diagram showing an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation apparatus 920. The memory 922 includes a RAM and a ROM storing programs executed by the processor 921 and data.

The GPS module 924 measures a position of the car navigation apparatus 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad to execute wireless LAN communication. The wireless communication interface 933 can communicate with another apparatus via a wireless LAN access point in the infrastructure mode. In addition, the wireless communication interface 933 can directly communicate with another apparatus in a direct communication mode, such as an ad hoc mode, Wi-Fi Direct, or the like. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation apparatus 920 may include a plurality of antennas, without being limited to the example of FIG. 14. In this case, the antenna switch 934 may be omitted from the configuration of the car navigation apparatus 920.

The battery 938 supplies electric power to each of the blocks of the car navigation apparatus 920 shown in FIG. 14 via power supply lines partially indicated by dashed lines in the drawing. In addition, the battery 938 accumulates electric power supplied from the vehicle.

The car navigation apparatus 920 shown in FIG. 14 can operate as the wireless node 20. In this case, for example, the wireless communication unit 210, the carrier sensing unit 220, the sensor unit 230, the data processing unit 240, the control unit 250, and the storage unit 260 shown in FIG. 4 may be mounted on the wireless communication interface 933. At least some of the functions may be mounted on the processor 921. Thus, the car navigation apparatus 920 can transmit the sensor signal using the radio resources appropriate for realizing the suppression of the packet loss in the base station without necessarily transmitting and receiving a control message. The car navigation apparatus 920 can reduce the power consumption of the battery 938 by selecting the appropriate radio resources based on the positional information.

The technology of the present disclosure may be realized as an in-vehicle system (or a vehicle) 940 including one or more blocks of the above-described car navigation apparatus 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

<6. Conclusion>

The embodiments of the technology related to the present disclosure have been described in detail with reference to FIGS. 1 to 14. According to the above-described embodiments, the wireless node 20 performing wireless communication with the base station 10 acquires the positional information of the wireless node 20, determines the area to which the wireless node 20 belongs based on the acquired positional information, and performs transmission according to the radio resources allocated to the belonging area. Accordingly, the wireless node 20 can use the appropriate radio resources singly irrespective of the control message from the base station 10, and thus it is possible to reduce power consumption related to the transmission and reception of the control message and the battery life of the wireless node 20 is prolonged. Since it is not necessary for the base station 10 to perform the determination process of allocating the radio resources either, a processing load is reduced.

Since the wireless nodes 20 in the hidden terminal state use the different radio resources, the collision of the sensor signals is avoided. Since the wireless nodes 20 transmitting the signals using the same radio resources belong to the same area, the distances to the base station 10 are identical and the perspective problem is resolved. Therefore, the base station 10 can separate the sensor signals through the despreading process and acquire the measurement data.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

The series of processes carried out by each apparatus described in the present specification may be realized by software, hardware, or a combination of software and hardware. Programs that compose such software may be stored in advance for example on a storage medium (non-transitory medium) provided inside or outside each apparatus. As one example, during execution by a computer, such programs are written into a random access memory (RAM) and executed by a processor such as a CPU.

Note that it is not necessary for the processes described in this specification with reference to the flowchart to be executed in the order shown in the flowchart. Some processing steps may be performed in parallel. Further, some of additional steps can be adopted, or some processing steps can be omitted.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A wireless communication device including:

a wireless communication unit configured to transmit a signal to a base station through wireless communication;

a positional information acquisition unit configured to acquire positional information indicating a position of the wireless communication device; and a control unit configured to determine an area to which the wireless communication device belongs based on the positional information acquired by the positional information acquisition unit and control the wireless communication unit to perform the transmission according to radio resources allocated to the area to which the wireless communication device belongs.

(2)

The wireless communication device according to (1), wherein a longest distance between two points included in the area is shorter than a distance at which a collision is avoidable through carrier sensing.

(3)

The wireless communication device according to (1) or (2), wherein the area is included in a group formed by a plurality of areas included in a cell administrated by the base station and radio resources not overlapping with the other areas included in the same group are allocated to the area.

(4)

The wireless communication device according to (3), wherein the area is included in the group formed by the plurality of areas included in the cell administrated by the base station and a transmission time zone to be allocated does not overlap with the other areas included in the same group.

(5)
The wireless communication device according to (3), wherein the area is included in the group formed by the plurality of areas included in the cell administrated by the base station and a transmission frequency to be allocated does not overlap with the other areas included in the same group.

(6)
The wireless communication device according to (3), wherein the area is included in the group formed by the plurality of areas included in the cell administrated by the base station and a combination of a transmission time zone and a transmission frequency to be allocated does not overlap with the other areas included in the same group.

(7)
The wireless communication device according to (3), wherein a distance between areas which are included in the different groups and to which the same radio resources are allocated is longer than a distance at which collision is avoidable through carrier sensing.

(8)
The wireless communication device according to any one of (1) to (7), wherein the control unit performs carrier sensing and backoff control and controls the wireless communication unit such that the wireless communication unit transmits a signal.

(9)
The wireless communication device according to any one of (1) to (8), wherein the wireless communication unit directly spreads a transmission signal using a spread code allocated to each wireless communication device.

(10)
The wireless communication device according to any one of (1) to (8), wherein the wireless communication unit performs subcarrier modulation on a transmission signal using a subcarrier allocated to the wireless communication device.

(11)
The wireless communication device according to any one of (1) to (10), wherein the control unit controls the wireless communication unit to perform the transmission using at least one of a transmission time zone and a frequency channel allocated to the area to which the wireless communication device belongs.

(12)
The wireless communication device according to any one of (1) to (11), wherein the control unit determines the area to which the wireless communication device belongs using a common rule to other wireless communication devices.

(13)
The wireless communication device according to any one of (1) to (12), further including:
a storage unit configured to store information indicating the radio resources common to other wireless communication devices and allocated to respective areas.

(14)
A wireless communication method performed by a wireless communication device which transmits a signal to a base station through wireless communication, the method including:
acquiring positional information indicating a position of the wireless communication device; and
determining an area to which the wireless communication device belongs based on the acquired positional information and controlling the wireless communication device to perform the transmission according to radio resources allocated to the area to which the wireless communication device belongs.

REFERENCE SIGNS LIST 1 wireless communication system
10 base station
110 wireless communication unit
112 high-frequency switch
114 demodulation unit
120 data processing unit
130 backbone communication unit
140 control unit
150 storage unit
20 wireless node, wireless communication device
210 wireless communication unit
212 high-frequency switch
214 modulation unit
220 carrier sensing unit
230 sensor unit
240 data processing unit
250 control unit
260 storage unit
270 positional information acquisition unit
11 cell
30 management server
40 backbone communication path

The invention claimed is:

1. A wireless communication device comprising:
wireless communication circuitry configured to transmit a signal to a base station through wireless communication;
processing circuitry configured to acquire positional information indicating a position of the wireless communication device;
cluster a longitude and a latitude indicated by the acquired positional information to respective values;
determine an area to which the wireless communication device belongs based on the cluster;
identify radio resources allocated to the area to which the wireless communication device belongs, the radio resources including at least a frequency channel or a time slot;
perform carrier sensing to confirm availability of the radio resources; and
transmit the signal using the radio resources, wherein the area is one of a plurality of areas, a division of the plurality of areas satisfying one or more conditions based on at least a transmission power and reception characteristics of the wireless communication device.

2. The wireless communication device according to claim 1, wherein a longest distance between two points included in the area is shorter than a distance at which a collision is not avoidable through carrier sensing.

3. The wireless communication device according to claim 1, wherein the area is included in a group formed by the plurality of areas included in a cell administrated by the base station and the radio resources not overlapping with the other areas included in the same group are allocated to the area.

4. The wireless communication device according to claim 3, wherein the area is included in the group formed by the plurality of areas included in the cell administrated by the base station and a transmission time zone to be allocated does not overlap with the other areas included in the same group.

5. The wireless communication device according to claim 3, wherein the area is included in the group formed by the plurality of areas included in the cell administrated by the base station and a transmission frequency to be allocated does not overlap with the other areas included in the same group.

6. The wireless communication device according to claim 3, wherein the area is included in the group formed by the plurality of areas included in the cell administrated by the base station and a combination of a transmission time zone and a transmission frequency to be allocated does not overlap with the other areas included in the same group.

7. The wireless communication device according to claim 3, wherein a distance between areas which are included in the different groups and to which a same set of the radio resources are allocated is longer than a distance at which collision is avoidable through carrier sensing.

8. The wireless communication device according to claim 1, wherein the processing circuitry is further configured to perform the carrier sensing and backoff control.

9. The wireless communication device according to claim 1, wherein the wireless communication circuitry directly spreads a transmission signal using a spread code allocated to each wireless communication device.

10. The wireless communication device according to claim 1, wherein the wireless communication circuitry is further configured to perform sub-carrier modulation on a transmission signal using a sub-carrier allocated to the wireless communication device.

11. The wireless communication device according to claim 1, wherein the the processing circuitry is further configured to control the wireless communication circuitry to perform the transmission using at least one of a transmission time zone and the frequency channel allocated to the area to which the wireless communication device belongs.

12. The wireless communication device according to claim 1, wherein the processing circuitry is further configured to determine the area to which the wireless communication device belongs using a common rule to other wireless communication devices.

13. The wireless communication device according to claim 1, further comprising:
a memory configured to store information indicating the radio resources common to other wireless communication devices and allocated to respective areas.

14. A wireless communication method performed by a wireless communication device which transmits a signal to a base station through wireless communication, the method comprising:
acquiring positional information indicating a position of the wireless communication device;
clustering a longitude and a latitude indicated by the acquired positional information to respective values;
determining an area to which the wireless communication device belongs based on the clustering;
identifying radio resources allocated to the area to which the wireless communication device belongs, the radio resources including at least a frequency channel or a time slot;
performing carrier sensing to confirm availability of the radio resources; and
transmitting the signal using the radio resources, wherein the area is one of a plurality of areas, a division of the plurality of areas satisfying one or more conditions based on at least a transmission power and reception characteristics of the wireless communication device.

* * * * *